US009114482B2

(12) United States Patent
Srinivas et al.

(10) Patent No.: US 9,114,482 B2
(45) Date of Patent: Aug. 25, 2015

(54) LASER BASED PROCESSING OF LAYERED MATERIALS

(75) Inventors: Ramanujapuram A. Srinivas, San Jose, CA (US); Michael Greenberg, Santa Rosa, CA (US); David Gaudiosi, Rohnert Park, CA (US); Michael Mielke, Santa Rosa, CA (US); Tim Booth, Penngrove, CA (US)

(73) Assignee: Raydiance, Inc., Petaluma, CA (US)

( * ) Notice: Subject to any disclaimer, the term of this patent is extended or adjusted under 35 U.S.C. 154(b) by 652 days.

(21) Appl. No.: 13/234,751

(22) Filed: Sep. 16, 2011

(65) Prior Publication Data

US 2012/0156875 A1 Jun. 21, 2012

Related U.S. Application Data

(60) Provisional application No. 61/383,691, filed on Sep. 16, 2010.

(51) Int. Cl.
*B23K 26/40* (2014.01)
*B23K 26/36* (2014.01)

(52) U.S. Cl.
CPC ............... *B23K 26/409* (2013.01); *B23K 26/36* (2013.01); *B23K 26/4085* (2013.01)

(58) Field of Classification Search
CPC .. B23K 26/36; B23K 26/4085; B23K 26/409; B23K 26/0635; B23K 26/032; B23K 26/03
See application file for complete search history.

(56) References Cited

U.S. PATENT DOCUMENTS

| | | | |
|---|---|---|---|
| 2,436,662 A | 2/1948 | Norgaard | |
| 3,459,960 A | 8/1969 | Aaland et al. | |
| 3,599,019 A | 8/1971 | Nannichi et al. | |
| 3,602,836 A | 8/1971 | Young | |
| 3,626,318 A | 12/1971 | Young | |
| 3,646,469 A | 2/1972 | Buczek et al. | |
| 3,654,624 A | 4/1972 | Becker et al. | |
| 3,764,641 A | 10/1973 | Ash | |
| 3,806,829 A | 4/1974 | Duston et al. | |
| 3,851,267 A | 11/1974 | Tanner | |
| 3,963,953 A | 6/1976 | Thornton, Jr. | |

(Continued)

FOREIGN PATENT DOCUMENTS

| | | |
|---|---|---|
| DE | WO2007000194 | 4/2007 |
| EP | 0214100 | 3/1987 |

(Continued)

OTHER PUBLICATIONS

Machine translation of Japan Patent document No. 2004-066,322, Nov. 2014.*

(Continued)

*Primary Examiner* — Geoffrey S Evans
(74) *Attorney, Agent, or Firm* — Haverstock & Owens LLP (57) ABSTRACT

Systems and methods for laser based processing of layered materials. Methods may include selectively adjusting ultrafast laser output of an ultrafast laser device based upon one or more physical attributes of a layer of the layered material, applying the ultrafast laser output of the ultrafast laser device to the layer of the layered material along a tool path to ablate the layer along the tool path, and then re-executing the steps to ablate one or more additional layers, the re-execution occurring for each distinct layer of the layered material that is to be ablated.

15 Claims, 4 Drawing Sheets

(56) References Cited

U.S. PATENT DOCUMENTS

| | | | |
|---|---|---|---|
| 4,061,427 | A | 12/1977 | Fletcher et al. |
| 4,194,813 | A | 3/1980 | Benjamin et al. |
| 4,289,378 | A | 9/1981 | Remy et al. |
| 4,449,215 | A | 5/1984 | Reno |
| 4,590,598 | A | 5/1986 | O'Harra, II |
| 4,622,095 | A | 11/1986 | Grobman et al. |
| 4,673,795 | A | 6/1987 | Ortiz, Jr. |
| 4,718,418 | A | 1/1988 | L'Esperance, Jr. |
| 4,730,113 | A | 3/1988 | Edwards et al. |
| 4,743,769 | A | 5/1988 | Schwaiger et al. |
| 4,808,000 | A | 2/1989 | Pasciak |
| 4,827,125 | A | 5/1989 | Goldstein |
| 4,835,670 | A | 5/1989 | Adams et al. |
| 4,847,846 | A | 7/1989 | Sone et al. |
| 4,848,340 | A | 7/1989 | Bille et al. |
| 4,856,011 | A | 8/1989 | Shimada et al. |
| 4,878,127 | A | 10/1989 | Zollman et al. |
| 4,902,127 | A | 2/1990 | Byer et al. |
| 4,907,586 | A | 3/1990 | Bille et al. |
| 4,915,757 | A | 4/1990 | Rando |
| 4,947,398 | A | 8/1990 | Yasuda et al. |
| 4,950,268 | A | 8/1990 | Rink |
| 4,983,034 | A | 1/1991 | Spillman, Jr. |
| 4,988,348 | A | 1/1991 | Bille |
| 4,994,059 | A | 2/1991 | Kosa et al. |
| 5,010,555 | A | 4/1991 | Madey et al. |
| 5,014,290 | A | 5/1991 | Moore et al. |
| 5,022,042 | A | 6/1991 | Bradley |
| 5,031,236 | A | 7/1991 | Hodgkinson et al. |
| 5,043,991 | A | 8/1991 | Bradley |
| 5,053,171 | A | 10/1991 | Portney et al. |
| 5,098,426 | A | 3/1992 | Sklar et al. |
| 5,122,439 | A | 6/1992 | Miersch et al. |
| 5,146,088 | A | 9/1992 | Kingham et al. |
| 5,154,707 | A | 10/1992 | Rink et al. |
| 5,159,402 | A | 10/1992 | Ortiz, Jr. |
| 5,162,643 | A | 11/1992 | Currie |
| 5,194,713 | A | 3/1993 | Egitto et al. |
| 5,204,517 | A * | 4/1993 | Cates et al. ............... 219/121.62 |
| 5,204,867 | A | 4/1993 | Koschmann |
| 5,206,455 | A | 4/1993 | Williams et al. |
| 5,217,003 | A | 6/1993 | Wilk |
| 5,255,117 | A | 10/1993 | Cushman |
| 5,265,107 | A | 11/1993 | Delfyett, Jr. |
| 5,265,114 | A | 11/1993 | Sun et al. |
| 5,286,941 | A | 2/1994 | Bel |
| 5,293,186 | A | 3/1994 | Seden et al. |
| 5,301,347 | A | 4/1994 | Kensky |
| 5,302,835 | A | 4/1994 | Bendett et al. |
| 5,309,453 | A | 5/1994 | Treacy |
| 5,315,436 | A | 5/1994 | Lowenhar et al. |
| 5,331,131 | A | 7/1994 | Opdyke |
| 5,355,383 | A | 10/1994 | Lockard |
| 5,409,376 | A | 4/1995 | Murphy |
| 5,411,918 | A | 5/1995 | Keible et al. |
| 5,418,809 | A | 5/1995 | August, Jr. et al. |
| 5,428,471 | A | 6/1995 | McDermott |
| 5,440,573 | A | 8/1995 | Fermann |
| 5,479,422 | A | 12/1995 | Fermann et al. |
| 5,493,096 | A * | 2/1996 | Koh ........................ 219/121.71 |
| 5,493,579 | A | 2/1996 | Ressl et al. |
| 5,517,043 | A | 5/1996 | Ma et al. |
| 5,520,679 | A | 5/1996 | Lin |
| 5,533,139 | A | 7/1996 | Parker et al. |
| 5,548,098 | A | 8/1996 | Sugawara et al. |
| 5,572,335 | A | 11/1996 | Stevens |
| 5,572,358 | A | 11/1996 | Gabl et al. |
| 5,585,642 | A | 12/1996 | Britton et al. |
| 5,585,652 | A | 12/1996 | Kamasz et al. |
| 5,585,913 | A | 12/1996 | Hariharan et al. |
| 5,590,142 | A | 12/1996 | Shan |
| 5,592,327 | A | 1/1997 | Gabl et al. |
| 5,595,668 | A * | 1/1997 | Madden et al. ................ 216/17 |
| 5,624,587 | A | 4/1997 | Otsuki et al. |
| 5,625,544 | A | 4/1997 | Kowshik et al. |
| 5,633,750 | A | 5/1997 | Nogiwa et al. |
| 5,633,885 | A | 5/1997 | Galvanauskas et al. |
| 5,651,018 | A | 7/1997 | Mehuys et al. |
| 5,656,186 | A | 8/1997 | Mourou et al. |
| 5,663,731 | A | 9/1997 | Theodoras, II et al. |
| 5,665,942 | A | 9/1997 | Williams et al. |
| 5,666,722 | A | 9/1997 | Tamm et al. |
| 5,670,067 | A | 9/1997 | Koide et al. |
| 5,677,769 | A | 10/1997 | Bendett |
| 5,681,490 | A | 10/1997 | Chang |
| 5,689,519 | A | 11/1997 | Fermann et al. |
| 5,696,782 | A | 12/1997 | Harter et al. |
| 5,703,639 | A | 12/1997 | Farrier et al. |
| 5,710,424 | A | 1/1998 | Theodoras, II et al. |
| 5,720,894 | A | 2/1998 | Neev et al. |
| 5,736,709 | A | 4/1998 | Neiheisel |
| 5,739,933 | A | 4/1998 | Dembeck et al. |
| 5,770,864 | A | 6/1998 | Dlugos |
| 5,771,253 | A | 6/1998 | Chang-Hasnain et al. |
| 5,778,016 | A | 7/1998 | Sucha et al. |
| 5,781,289 | A | 7/1998 | Sabsabi et al. |
| 5,786,117 | A | 7/1998 | Hoshi et al. |
| 5,788,688 | A | 8/1998 | Bauer et al. |
| 5,790,574 | A | 8/1998 | Rieger et al. |
| 5,815,519 | A | 9/1998 | Aoshima et al. |
| 5,833,759 | A * | 11/1998 | Haslow et al. ................ 134/1.3 |
| 5,841,099 | A | 11/1998 | Owen et al. |
| 5,844,149 | A | 12/1998 | Akiyoshi et al. |
| 5,847,825 | A | 12/1998 | Alexander |
| 5,862,845 | A | 1/1999 | Chin et al. |
| 5,875,408 | A | 2/1999 | Bendett et al. |
| 5,880,823 | A | 3/1999 | Lu |
| 5,898,485 | A | 4/1999 | Nati, Jr. |
| 5,903,662 | A | 5/1999 | DeCarlo |
| 5,907,157 | A | 5/1999 | Yoshioka et al. |
| 5,929,430 | A | 7/1999 | Yao et al. |
| 5,936,716 | A | 8/1999 | Pinsukanjana et al. |
| 5,994,667 | A | 11/1999 | Merdan et al. |
| 5,999,847 | A | 12/1999 | Elstrom |
| 6,016,452 | A | 1/2000 | Kasevich |
| 6,020,591 | A | 2/2000 | Harter et al. |
| 6,034,975 | A | 3/2000 | Harter et al. |
| 6,041,020 | A | 3/2000 | Caron et al. |
| 6,061,373 | A | 5/2000 | Brockman et al. |
| 6,071,276 | A | 6/2000 | Abela |
| 6,075,220 | A | 6/2000 | Essien et al. |
| 6,075,588 | A | 6/2000 | Pinsukanjana et al. |
| 6,091,749 | A * | 7/2000 | Hoffmaster et al. ........ 372/38.02 |
| 6,099,522 | A | 8/2000 | Knopp et al. |
| 6,120,857 | A | 9/2000 | Balooch et al. |
| 6,134,003 | A | 10/2000 | Tearney et al. |
| 6,156,030 | A | 12/2000 | Neev |
| 6,161,543 | A | 12/2000 | Cox et al. |
| 6,168,590 | B1 | 1/2001 | Neev |
| 6,172,611 | B1 | 1/2001 | Hussain et al. |
| 6,179,421 | B1 | 1/2001 | Pang |
| 6,181,463 | B1 | 1/2001 | Galvanauskas et al. |
| 6,190,380 | B1 | 2/2001 | Abela |
| 6,198,568 | B1 | 3/2001 | Galvanauskas et al. |
| 6,208,458 | B1 | 3/2001 | Galvanauskas et al. |
| 6,211,485 | B1 | 4/2001 | Burgess |
| 6,228,748 | B1 | 5/2001 | Anderson et al. |
| 6,246,816 | B1 | 6/2001 | Moore et al. |
| 6,249,630 | B1 | 6/2001 | Stock et al. |
| 6,256,328 | B1 | 7/2001 | Delfyett et al. |
| 6,271,650 | B1 | 8/2001 | Massie et al. |
| 6,275,250 | B1 | 8/2001 | Sanders et al. |
| 6,290,910 | B1 | 9/2001 | Chalk |
| 6,303,903 | B1 | 10/2001 | Liu |
| 6,314,115 | B1 | 11/2001 | Delfyett et al. |
| 6,325,792 | B1 | 12/2001 | Swinger et al. |
| 6,327,074 | B1 | 12/2001 | Bass et al. |
| 6,335,821 | B1 | 1/2002 | Suzuki et al. |
| 6,340,806 | B1 | 1/2002 | Smart et al. |
| 6,344,625 | B1 | 2/2002 | Kim et al. |
| RE37,585 | E | 3/2002 | Mourou et al. |
| 6,355,908 | B1 | 3/2002 | Tatah et al. |
| 6,359,681 | B1 | 3/2002 | Housand et al. |
| 6,362,454 | B1 | 3/2002 | Liu |

(56) References Cited

U.S. PATENT DOCUMENTS

| | | |
|---|---|---|
| 6,365,869 B1 | 4/2002 | Swain et al. |
| 6,366,395 B1 | 4/2002 | Drake et al. |
| 6,370,171 B1 | 4/2002 | Horn et al. |
| 6,371,469 B1 | 4/2002 | Gray |
| 6,396,317 B1 | 5/2002 | Roller et al. |
| 6,407,363 B2 | 6/2002 | Dunsky et al. |
| 6,418,154 B1 | 7/2002 | Kneip et al. |
| 6,425,912 B1 | 7/2002 | Knowlton |
| 6,433,301 B1 | 8/2002 | Dunsky et al. |
| 6,433,303 B1 | 8/2002 | Liu et al. |
| 6,433,305 B1 | 8/2002 | Liu et al. |
| 6,433,760 B1 | 8/2002 | Vaissie et al. |
| 6,437,283 B1 | 8/2002 | Wiggermann et al. |
| 6,463,314 B1 | 10/2002 | Haruna |
| 6,482,199 B1 | 11/2002 | Neev |
| 6,485,413 B1 | 11/2002 | Boppart et al. |
| 6,486,435 B1 | 11/2002 | Beyer et al. |
| 6,496,099 B2 | 12/2002 | Wang et al. |
| 6,501,590 B2 | 12/2002 | Bass et al. |
| 6,522,460 B2 | 2/2003 | Bonnedal et al. |
| 6,522,674 B1 | 2/2003 | Niwano et al. |
| 6,525,873 B2 | 2/2003 | Gerrish et al. |
| 6,526,085 B2 | 2/2003 | Vogler et al. |
| 6,526,327 B2 | 2/2003 | Kar et al. |
| 6,529,319 B2 | 3/2003 | Youn et al. |
| 6,541,731 B2 | 4/2003 | Mead et al. |
| 6,547,453 B1 | 4/2003 | Stummer et al. |
| 6,549,547 B2 | 4/2003 | Galvanauskas et al. |
| 6,552,301 B2 | 4/2003 | Herman et al. |
| 6,555,781 B2 | 4/2003 | Ngoi et al. |
| 6,562,698 B2 | 5/2003 | Manor |
| 6,566,888 B1 | 5/2003 | Bruce et al. |
| 6,570,704 B2 | 5/2003 | Palese |
| 6,574,024 B1 | 6/2003 | Liu |
| 6,574,250 B2 | 6/2003 | Sun et al. |
| 6,576,917 B1 | 6/2003 | Silfvast |
| 6,580,553 B2 | 6/2003 | Kim et al. |
| 6,583,381 B1 | 6/2003 | Duignan |
| 6,592,574 B1 | 7/2003 | Shimmick et al. |
| 6,593,753 B2 | 7/2003 | Scott et al. |
| 6,614,565 B1 | 9/2003 | Klug et al. |
| 6,621,040 B1 | 9/2003 | Perry et al. |
| 6,621,045 B1 | 9/2003 | Liu et al. |
| 6,627,421 B1 | 9/2003 | Unger et al. |
| 6,627,844 B2 | 9/2003 | Liu et al. |
| 6,642,477 B1 | 11/2003 | Patel et al. |
| 6,654,161 B2 | 11/2003 | Bass et al. |
| 6,661,568 B2 | 12/2003 | Hollemann et al. |
| 6,661,820 B1 | 12/2003 | Camilleri et al. |
| 6,677,552 B1 | 1/2004 | Tulloch et al. |
| 6,681,079 B1 | 1/2004 | Maroney |
| 6,690,686 B2 | 2/2004 | Delfyett et al. |
| 6,695,835 B2 | 2/2004 | Furuno et al. |
| 6,696,008 B2 | 2/2004 | Brandinger |
| 6,697,402 B2 | 2/2004 | Crawford |
| 6,697,408 B2 | 2/2004 | Kennedy et al. |
| 6,700,094 B1 | 3/2004 | Kuntze |
| 6,706,036 B2 | 3/2004 | Lai |
| 6,706,998 B2 | 3/2004 | Cutler |
| 6,710,288 B2 | 3/2004 | Liu et al. |
| 6,710,293 B2 | 3/2004 | Liu et al. |
| 6,720,519 B2 | 4/2004 | Liu et al. |
| 6,727,458 B2 | 4/2004 | Smart |
| 6,728,273 B2 | 4/2004 | Perry |
| 6,728,439 B2 | 4/2004 | Weisberg et al. |
| 6,735,229 B1 | 5/2004 | Delfyett et al. |
| 6,738,144 B1 | 5/2004 | Dogariu |
| 6,738,408 B2 | 5/2004 | Abedin |
| 6,744,552 B2 | 6/2004 | Scalora et al. |
| 6,744,555 B2 | 6/2004 | Galvanauskas et al. |
| 6,749,285 B2 | 6/2004 | Liu et al. |
| 6,774,869 B2 | 8/2004 | Biocca et al. |
| 6,782,207 B1 | 8/2004 | Efimov |
| 6,785,445 B2 | 8/2004 | Kuroda et al. |
| 6,787,733 B2 | 9/2004 | Lubatschowski et al. |
| 6,787,734 B2 | 9/2004 | Liu |
| 6,791,060 B2 | 9/2004 | Dunsky et al. |
| 6,791,071 B2 | 9/2004 | Woo et al. |
| 6,795,461 B1 | 9/2004 | Blair et al. |
| 6,801,551 B1 | 10/2004 | Delfyett et al. |
| 6,803,539 B2 | 10/2004 | Liu et al. |
| 6,804,574 B2 * | 10/2004 | Liu et al. ............ 700/166 |
| 6,807,375 B2 | 10/2004 | Dogariu |
| 6,815,638 B2 | 11/2004 | Liu |
| 6,819,694 B2 | 11/2004 | Jiang et al. |
| 6,819,837 B2 | 11/2004 | Li et al. |
| 6,822,187 B1 | 11/2004 | Hermann et al. |
| 6,822,251 B1 | 11/2004 | Arenberg et al. |
| 6,824,540 B1 | 11/2004 | Lin |
| 6,829,517 B2 | 12/2004 | Cheng et al. |
| 6,834,134 B2 | 12/2004 | Brennan, III et al. |
| 6,836,703 B2 | 12/2004 | Wang et al. |
| 6,878,900 B2 | 4/2005 | Corkum et al. |
| 6,887,804 B2 | 5/2005 | Sun et al. |
| 6,897,405 B2 | 5/2005 | Cheng et al. |
| 6,902,561 B2 | 6/2005 | Kurtz et al. |
| 6,915,040 B2 | 7/2005 | Willner et al. |
| 6,917,631 B2 | 7/2005 | Richardson et al. |
| 6,928,490 B1 | 8/2005 | Bucholz et al. |
| 6,943,359 B2 | 9/2005 | Vardeny et al. |
| 6,994,703 B2 | 2/2006 | Wang et al. |
| 6,998,569 B2 | 2/2006 | Schumacher |
| 7,001,373 B2 | 2/2006 | Clapham et al. |
| 7,002,733 B2 | 2/2006 | Dagenais et al. |
| 7,022,119 B2 | 4/2006 | Hohla |
| 7,068,408 B2 | 6/2006 | Sakai |
| 7,097,640 B2 | 8/2006 | Wang et al. |
| 7,116,688 B2 | 10/2006 | Sauter et al. |
| 7,132,289 B2 | 11/2006 | Kobayashi et al. |
| 7,143,769 B2 | 12/2006 | Stoltz et al. |
| 7,217,266 B2 | 5/2007 | Anderson et al. |
| 7,220,255 B2 | 5/2007 | Lai |
| 7,332,234 B2 | 2/2008 | Levinson et al. |
| 7,344,671 B2 | 3/2008 | Basque et al. |
| 7,349,589 B2 | 3/2008 | Temelkuran et al. |
| 7,361,171 B2 | 4/2008 | Stoltz et al. |
| 7,367,969 B2 | 5/2008 | Stoltz et al. |
| 7,413,565 B2 | 8/2008 | Wang et al. |
| 7,414,780 B2 | 8/2008 | Fermann et al. |
| 7,505,196 B2 | 3/2009 | Nati et al. |
| 7,674,719 B2 | 3/2010 | Li et al. |
| 7,675,674 B2 | 3/2010 | Bullington et al. |
| 7,728,967 B2 | 6/2010 | Ochiai et al. |
| 7,751,118 B1 | 7/2010 | Di Teodoro et al. |
| 7,759,607 B2 | 7/2010 | Chism, II |
| 7,773,216 B2 | 8/2010 | Cheng et al. |
| 7,792,408 B2 | 9/2010 | Varming |
| 7,822,347 B1 | 10/2010 | Brennan, III et al. |
| 7,847,213 B1 | 12/2010 | Anikitchev |
| 7,943,533 B2 | 5/2011 | Mizuno |
| 7,963,958 B2 | 6/2011 | Stoltz et al. |
| 7,998,404 B2 | 8/2011 | Huang et al. |
| RE43,605 E | 8/2012 | O'Brien et al. |
| 8,338,746 B2 | 12/2012 | Sun et al. |
| 8,373,090 B2 | 2/2013 | Gale et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0071454 A1 | 6/2002 | Lin |
| 2002/0091325 A1 | 7/2002 | Ostrovsky |
| 2002/0095142 A1 | 7/2002 | Ming |
| 2002/0097468 A1 | 7/2002 | Mecherle et al. |
| 2002/0097761 A1 | 7/2002 | Sucha et al. |
| 2002/0115273 A1 | 8/2002 | Chandra et al. |
| 2002/0118934 A1 | 8/2002 | Danziger et al. |
| 2002/0153500 A1 | 10/2002 | Fordahl et al. |
| 2002/0162973 A1 | 11/2002 | Cordingley et al. |
| 2002/0167581 A1 | 11/2002 | Cordingley et al. |
| 2002/0167974 A1 | 11/2002 | Kennedy et al. |
| 2002/0169379 A1 * | 11/2002 | Camacho et al. ............ 600/473 |
| 2002/0191901 A1 | 12/2002 | Jensen |
| 2003/0011782 A1 | 1/2003 | Tanno |
| 2003/0031410 A1 | 2/2003 | Schnitzer |

(56) References Cited

U.S. PATENT DOCUMENTS

| | | |
|---|---|---|
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0095266 A1 | 5/2003 | Detalle et al. |
| 2003/0122550 A1 | 7/2003 | Kanamaru et al. |
| 2003/0123496 A1 | 7/2003 | Broutin et al. |
| 2003/0129423 A1 | 7/2003 | Mastromatteo et al. |
| 2003/0142705 A1 | 7/2003 | Hackel et al. |
| 2003/0156605 A1 | 8/2003 | Richardson et al. |
| 2003/0178396 A1 | 9/2003 | Naumov et al. |
| 2003/0180569 A1 | 9/2003 | Hamann et al. |
| 2003/0189959 A1 | 10/2003 | Erbert et al. |
| 2003/0205561 A1 | 11/2003 | Iso |
| 2003/0223689 A1 | 12/2003 | Koch et al. |
| 2003/0235381 A1 | 12/2003 | Hunt |
| 2004/0022695 A1 | 2/2004 | Simon et al. |
| 2004/0042061 A1 | 3/2004 | Islam et al. |
| 2004/0049552 A1 | 3/2004 | Motoyama et al. |
| 2004/0069754 A1 | 4/2004 | Bates et al. |
| 2004/0101001 A1 | 5/2004 | Bergmann et al. |
| 2004/0108811 A1 * | 6/2004 | Klausmann et al. .......... 313/512 |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226922 A1 | 11/2004 | Flanagan |
| 2004/0226925 A1 | 11/2004 | Gu et al. |
| 2004/0231682 A1 | 11/2004 | Stoltz et al. |
| 2004/0263950 A1 | 12/2004 | Fermann et al. |
| 2005/0001166 A1 * | 1/2005 | Sanzari .................... 250/339.11 |
| 2005/0029238 A1 | 2/2005 | Chen |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0074974 A1 | 4/2005 | Stoltz |
| 2005/0077275 A1 | 4/2005 | Stoltz |
| 2005/0107773 A1 | 5/2005 | Bergt et al. |
| 2005/0111073 A1 | 5/2005 | Pan et al. |
| 2005/0122525 A1 | 6/2005 | Borden et al. |
| 2005/0127049 A1 | 6/2005 | Woeste et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171516 A1 | 8/2005 | Stoltz et al. |
| 2005/0171518 A1 | 8/2005 | Stoltz et al. |
| 2005/0177143 A1 | 8/2005 | Bullington et al. |
| 2005/0195726 A1 | 9/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226286 A1 | 10/2005 | Liu et al. |
| 2005/0226287 A1 | 10/2005 | Shah et al. |
| 2005/0236378 A1 * | 10/2005 | Boyle et al. ............. 219/121.67 |
| 2005/0253482 A1 | 11/2005 | Kapps et al. |
| 2005/0255715 A1 * | 11/2005 | Cheng et al. ................ 438/795 |
| 2005/0265407 A1 | 12/2005 | Braun et al. |
| 2005/0271094 A1 | 12/2005 | Miller et al. |
| 2005/0274702 A1 | 12/2005 | Deshi |
| 2006/0016891 A1 | 1/2006 | Giebel et al. |
| 2006/0030951 A1 | 2/2006 | Davlin et al. |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0081101 A1 | 4/2006 | Hayashi et al. |
| 2006/0084957 A1 | 4/2006 | Delfyett et al. |
| 2006/0091125 A1 | 5/2006 | Li et al. |
| 2006/0093265 A1 | 5/2006 | Jia et al. |
| 2006/0096426 A1 | 5/2006 | Park |
| 2006/0096962 A1 | 5/2006 | Park |
| 2006/0128073 A1 | 6/2006 | Sun et al. |
| 2006/0131288 A1 | 6/2006 | Sun et al. |
| 2006/0159137 A1 | 7/2006 | Shah |
| 2006/0187974 A1 | 8/2006 | Dantus |
| 2006/0201983 A1 | 9/2006 | Kusama et al. |
| 2006/0237397 A1 | 10/2006 | Yamasaki et al. |
| 2006/0249816 A1 | 11/2006 | Li et al. |
| 2006/0250025 A1 | 11/2006 | Kitagawa et al. |
| 2006/0268949 A1 | 11/2006 | Gohle et al. |
| 2007/0012665 A1 * | 1/2007 | Nelson et al. ............ 219/121.69 |
| 2007/0047965 A1 | 3/2007 | Liu et al. |
| 2007/0084837 A1 * | 4/2007 | Kosmowski ............. 219/121.68 |
| 2007/0098025 A1 | 5/2007 | Hong et al. |
| 2007/0106416 A1 | 5/2007 | Griffiths et al. |
| 2007/0151961 A1 | 7/2007 | Kleine et al. |
| 2007/0166965 A1 | 7/2007 | Tanaka et al. |
| 2007/0215581 A1 | 9/2007 | Kato et al. |
| 2007/0229939 A1 | 10/2007 | Brown et al. |
| 2007/0235418 A1 | 10/2007 | Park et al. |
| 2007/0253455 A1 | 11/2007 | Stadler et al. |
| 2008/0029152 A1 | 2/2008 | Milshtein et al. |
| 2008/0050078 A1 | 2/2008 | Digonnet et al. |
| 2008/0058781 A1 | 3/2008 | Langeweyde et al. |
| 2008/0076233 A1 | 3/2008 | Morishige et al. |
| 2008/0157656 A1 | 7/2008 | Liao et al. |
| 2008/0240184 A1 | 10/2008 | Cho et al. |
| 2008/0264910 A1 | 10/2008 | Kashyap et al. |
| 2009/0020511 A1 | 1/2009 | Kommera et al. |
| 2009/0045176 A1 | 2/2009 | Wawers et al. |
| 2009/0061724 A1 * | 3/2009 | Cok et al. ........................ 445/58 |
| 2009/0151996 A1 | 6/2009 | Mishima et al. |
| 2009/0189159 A1 * | 7/2009 | Enicks et al. .................... 257/63 |
| 2009/0244695 A1 | 10/2009 | Marcinkevicius et al. |
| 2009/0245302 A1 | 10/2009 | Baird et al. |
| 2009/0257464 A1 | 10/2009 | Dantus et al. |
| 2009/0273828 A1 | 11/2009 | Waarts et al. |
| 2009/0290151 A1 | 11/2009 | Agrawal et al. |
| 2009/0297155 A1 | 12/2009 | Weiner et al. |
| 2010/0013036 A1 | 1/2010 | Carey |
| 2010/0032416 A1 | 2/2010 | Jeong et al. |
| 2010/0040095 A1 | 2/2010 | Mielke et al. |
| 2010/0072183 A1 | 3/2010 | Park |
| 2010/0089882 A1 | 4/2010 | Tamura |
| 2010/0118899 A1 | 5/2010 | Peng et al. |
| 2010/0181284 A1 | 7/2010 | Lee et al. |
| 2010/0240155 A1 * | 9/2010 | Chang et al. ..................... 438/16 |
| 2010/0276405 A1 | 11/2010 | Cho et al. |
| 2011/0049765 A1 | 3/2011 | Li et al. |
| 2011/0100967 A1 * | 5/2011 | Yoo et al. ................. 219/121.83 |
| 2011/0207328 A1 | 8/2011 | Speakman |
| 2011/0284510 A1 * | 11/2011 | Reeves-Hall et al. ..... 219/121.72 |
| 2011/0287607 A1 * | 11/2011 | Osako et al. ................... 438/462 |
| 2012/0000893 A1 * | 1/2012 | Broude et al. ........... 219/121.69 |
| 2012/0152915 A1 | 6/2012 | Srinivas et al. |

FOREIGN PATENT DOCUMENTS

| | | | |
|---|---|---|---|
| EP | 544398 A1 * | 6/1993 | |
| EP | 0691563 | 1/1996 | |
| EP | 1462831 | 9/2004 | |
| GB | 2331038 A | 12/1999 | |
| JP | 405104276 A | 4/1993 | |
| JP | 06114577 A | 4/1994 | |
| JP | 06170822 A | 6/1994 | |
| JP | 8171103 | 7/1996 | |
| JP | 11189472 | 7/1999 | |
| JP | 2003181661 | 7/2003 | |
| JP | 2003344883 | 12/2003 | |
| JP | 2004-066322 A * | 3/2004 | |
| JP | 2005174993 | 6/2005 | |
| WO | WO9428972 | 12/1994 | |
| WO | WO-02/29853 A2 * | 4/2002 | |
| WO | WO-2004/060600 A2 * | 7/2004 | |
| WO | WO2004105100 | 12/2004 | |
| WO | WO2004114473 | 12/2004 | |
| WO | WO2005018060 | 2/2005 | |
| WO | WO2005018061 | 2/2005 | |
| WO | WO2005018062 | 2/2005 | |
| WO | WO2005018063 | 2/2005 | |
| WO | WO2007034317 | 3/2007 | |
| WO | 2009115484 A1 | 9/2009 | |

(56) References Cited

OTHER PUBLICATIONS

Siegman, "Unstable Optical Resonators", Applied Optics, Feb. 1974, pp. 353-367, vol. 13, No. 2.
Stevenson et al., Femtosecond Optical Transfection of Cells: Viability and Efficiency, Optics Express, vol. 14, No. 16, pp. 7125-7133, Aug. 7, 2006.
Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.
Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985.
Temelkuran, B. et al., "Wavelength-scalable Hollow Optical Fibres with Large Photonic Bandgaps for CO2 Laser Transmission," Nature, Dec. 12, 2002, pp. 650-653.
Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.
Tirlapur et al., "Targeted Transfection by Femtosecond Laser," Nature Publishing Group, vol. 418, pp. 290-291, Jul. 18, 2002.
Tsai et al., "Ultrashort Pulsed Laser Light," Optics & Photonics News, pp. 25-29, Jul. 2004.
Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.
Weiner, A.M. et al., "Synthesis of Phase-coherent, Picosecond Optical Square Pulses," Optics Letters, vol. 11, No. 3, pp. 153-155, Mar. 1986.
Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yan et al., Ultrashort Pulse Measurement Using Interferometric Autocorrelator Based on Two-photon-absorbtion Detector at 1.55 μm Wavelength Region., 2005, Proceedings of SPIE vol. 5633, Advanced Materials and Devices for Sensing and Imaging II, pp. 424-429.
Yeh, et al. "Theory of Bragg Fiber", Journal of the Optical Society America, Sep. 1978, pp. 1196, vol. 68, No. 9., pp. 1196-1201.
Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.
Yi, Y., et al., "On-chip Si-based Bragg Cladding Waveguide with High Index Contrast Bilayers", Optics Express, vol. 12, No. 20, Oct. 4, 2004, pp. 4775-4780.
Yin, D. et al., "Integrated ARROW Waveguides with Hollow Cores", Optics Express, vol. 12, No. 12, Jun. 14, 2004, pp. 2710-2715.
Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.
Agostinelli, J. et al., "Optical Pulse Shaping with a Grating Pair," Applied Optics, vol. 18, No. 14, pp. 2500-2504, Jul. 15, 1979.
Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.
Benoit, G. et al., "Dynamic All-optical Tuning of Transverse Resonant Cavity Modes in Photonic Bandgap Fibers,"Optics Letters, vol. 30, No. 13, Jul. 1, 2005, pp. 1620-1622.
Chen, X. et al., "Highly Birefringent Hollow-core Photonic Bandgap Fiber," Optics Express, vol. 12, No. 16, Aug. 9, 2004, pp. 3888-3893.
Chen, Y. et al., "Dispersion-Managed Mode Locking", Journal of the Optical Society of America B, Nov. 1999, pp. 1999-2004, vol. 16, No. 11, Optical Society of America.
Dasgupta, S. et al., "Design of Dispersion-Compensating Bragg Fiber with an Ultrahigh Figure of Merit," Optics Letters, Aug. 1, 2005, vol. 30, No. 15, Optical Society of America.
De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.
De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.
Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.
Eggleton, et al., "Electrically Tunable Power Efficient Dispersion Compensating Fiber Bragg Grating," IEEE Photonics Technology Letters, vol. 11, No. 7, pp. 854-856, Jul. 1999.
Engeness et al., "Dispersion Tailoring and Compensation by Modal Interations in Omniguide Fibers," Optics Express, May 19, 2003, pp. 1175-1196, vol. 11, No. 10.
Fink et al., "Guiding Optical Light in Air Using an All-Dielectric Structure," Journal of Lightwave Technology, Nov. 1999, pp. 2039-2041, vol. 17, No. 11.
Folkenberg, J.R., et al., "Broadband Single-polarization Photonic Crystal Fiber," Optics Letters, vol. 30, No. 12, Jun. 15, 2005, pp. 1446-1448.
Folkenberg, J.R., et al., "Polarization Maintaining Large Mode Area Photonic Crystal Fiber," Optics Express vol. 12, No. 5, Mar. 8, 2004, pp. 956-960.
Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.
Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.
Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-777-6.
Hellstrom, E. et al., "Third-order Dispersion Compensation Using a Phase Modulator", Journal of Lightwave Technology, vol. 21, No. 5, pp. 1188-1197, May 2003.
Heritage, J. P. et al., "Picosecond Pulse Shaping by Spectral Phase and Amplitude Manipulation," Optics Letters, vol. 10, No. 12, pp. 609-611, Dec. 1985.
Heritage, J.P. et al., "Spectral Windowing of Frequency-Modulated Optical Pulses in a Grating Compressor," Applied Physics Letters, vol. 47, No. 2, pp. 87-89, Jul. 15, 1985.
Hill, K. et al., "Fiber Bragg Grating Technology Fundamentals and Overview," Journal of Lightwave Technology, Aug. 1997, vol. 15, No. 8, pp. 1263-1276.
Jiang, et al., "Fully Dispersion Compensated~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated~500 fs Pulse Transmission Over 50 km Single Mode Fiber," Purdue University ECE Annual Research Summary, Jul. 1, 2004-Jun. 30, 2005.

(56) References Cited

OTHER PUBLICATIONS

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.
Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.
Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Levy et al., "Engineering Space-Variant Inhomogeneous Media for Polarization Control," Optics Letters, Aug. 1, 2004, pp. 1718-1720, vol. 29, No. 15, Optical Society of America.
Liao, Kai-Hsiu et al., "Large-aperture Chirped Volume Bragg Grating Based Fiber CPA System,"Optics Express, Apr. 16, 2007, vol. 15, No. 8, pp. 4876-4882.
Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.
Lo, S. et al., "Semiconductor Hollow Optical Waveguides Formed by Omni-directional Reflectors", Optics Express, vol. 12, No. 26, Dec. 27, 2004, pp. 6589-6593.
Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.
Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.
Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.
Noda, J. et al., "Polarization-maintaining Fibers and Their Applications", Journal of Lightwave Technology, vol. Lt-4, No. 8 Aug. 1986, pp. 1071-1089.
Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.
Pelusi, M. et al., "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.
Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.
Price et al., "Advances in High Power, Short Pulse, Fiber Laser Systems and Technology", Photonics West 2005, San Jose, California, Jan. 2005, pp. 5709-3720.
Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.
Resan et al., "Dispersion-Managed Semiconductor Mode-Locked Ring Laser", Optics Letters, Aug. 1, 2003, pp. 1371-1373, vol. 28, No. 15, Optical Society of America.
Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

* cited by examiner

LASER BASED PROCESSING OF LAYERED MATERIALS

CROSS-REFERENCE TO RELATED APPLICATION

This non-provisional patent application claims the priority benefit of U.S. provisional patent application No. 61/383,691, filed on Sep. 16, 2010 and titled "Semiconductor Processing using Lasers"—which is hereby incorporated by reference in its entirety.

BACKGROUND

Field of the Invention

The present technology relates generally to laser processing. More specifically, the present technology relates to systems and method for ablating materials utilizing a laser.

SUMMARY

According to some embodiments, the present technology may be directed to methods for selectively ablating one or more layers of a layered material. The methods may comprise: (a) selectively adjusting ultrafast laser output of an ultrafast laser device based upon one or more physical attributes of a layer of the layered material; (b) applying the ultrafast laser output of the ultrafast laser device to the layer of the layered material along a tool path to ablate the layer along the tool path; (c) re-executing steps (a) and (b) to ablate one or more additional layers, the re-execution of steps (a) and (b) occurring for each distinct layer of the layered material that is to be ablated; and (d) wherein the selective ablation of the layered material prepares the layered material for subsequent processing.

According to other embodiments, the present technology may be directed to systems for selectively ablating one or more layers of a layered material. The systems may include (a) an ultrafast laser device comprising: (i) a laser generating assembly for generating selectively adjustable ultrafast laser output; (ii) a beam delivery assembly for delivering the selectively adjustable ultrafast laser output to the one or more layers of the layered material; (iii) wherein the ultrafast laser device is communicatively coupled with a processor, the processor executing instructions selectively adjusting the ultrafast laser output, the instructions comprising: (1) a control module that: (A) selectively adjusts the ultrafast laser output of the ultrafast laser device by selectively adjusting at least one of the laser generating assembly and the beam delivery assembly, based upon one or more physical attributes of a layer of the layered material received from an analysis module; (B) applies the ultrafast laser output of the ultrafast laser device to the layer of the layered material along a tool path to ablate the layer along the tool path; and (C) wherein the selective ablation of the layered material prepares the layered material for subsequent processing.

According to additional embodiments, the present technology may be directed to methods for preparing a layered material for subsequent processing, the layered material including a getter layer disposed on an outer surface of the layer material. Methods may include (a) selectively adjusting ultrafast laser output of an ultrafast laser device based upon the physical attributes of the getter layer; and (b) applying the ultrafast laser output of the ultrafast laser device to the getter layer according to a pattern to ablate the getter layer and expose a device layer positioned below the getter layer.

According to some embodiments, the present technology may be directed to methods for processing a semiconductor wafer, the wafer having a base layer, one or more device layers, and a getter layer. These methods may include (a) applying ultrafast laser output of an ultrafast laser to remove at least a portion of the getter layer from the semiconductor wafer; and (b) selectively applying ultrafast laser output of the ultrafast laser to at least one of the one or more device layers to ablate at least a portion of the at least one device layer to create a device structure therein.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology relates generally to laser processing of layered materials, and more specifically, but not by way of limitation, to systems and methods that utilize selectively adjustable ultrafast laser output for ablating individual layers of the layered materials, based upon the physical attributes of each layer. The present technology may also selectively ablate portions of layers in preparation for subsequent processing steps that may include any of laser, chemical, or mechanical processes.

Generally speaking, the present technology may perform substrate plasma dicing, wafer scribing, shockwave induced cleaving, and generate coating features to enhance light source ability during processing. Also, the present technology is broadly directed to systems and methods that process (e.g., singulate, etch, mill, ablate, and so forth) layered materials by selectively ablating individual layers with ultrafast laser output that may be tailored to ablate individual layers based upon their physical attributes (e.g., physical properties such as density, opacity, crystalline structure, molecular components, and so forth).

Additionally, the present technology may also utilize one or more ultrafast laser devices that generate ultrafast laser output that may be selectively adjusted based upon the physical attributes of the layer currently being processed.

Figures 1A, 1B:
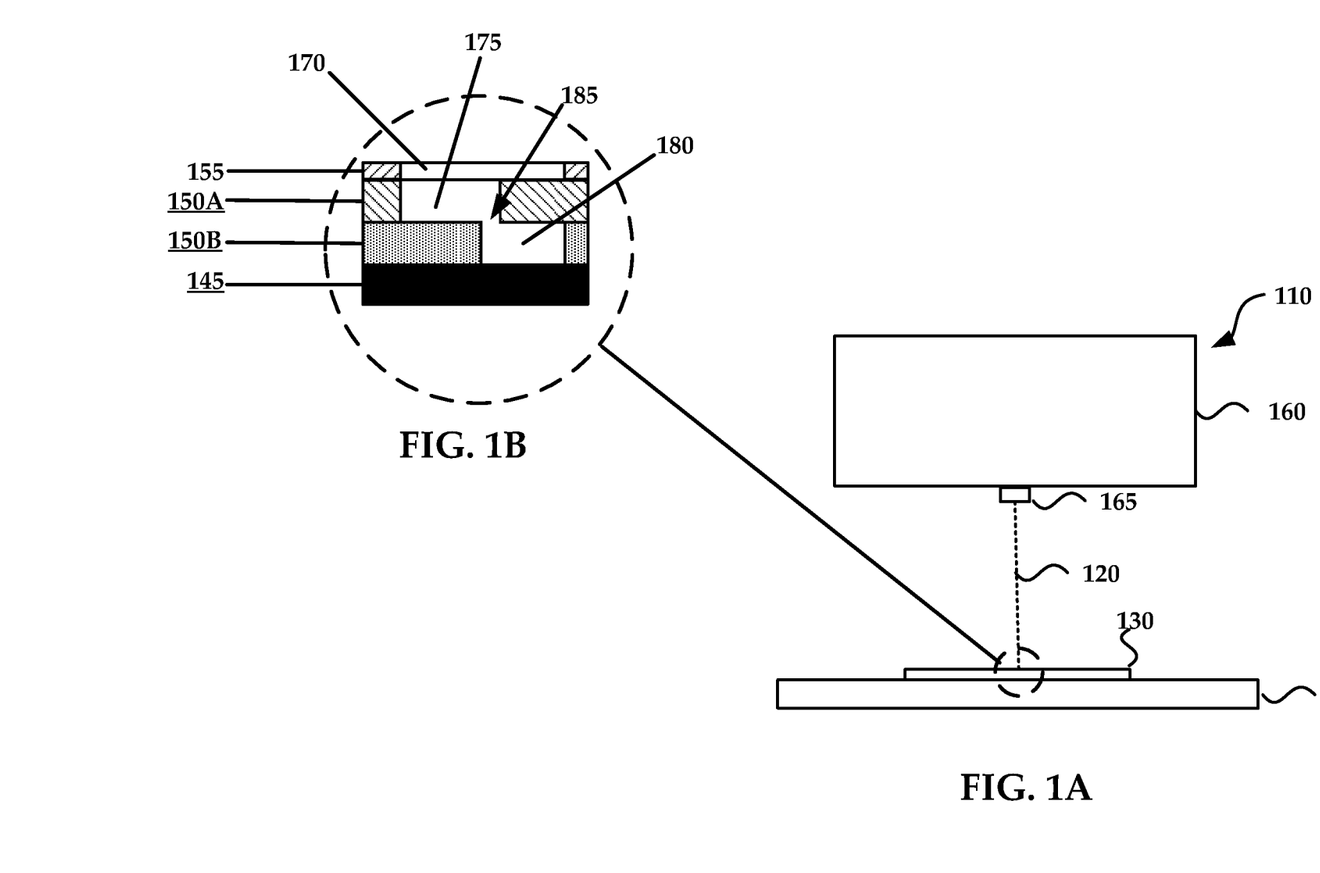
FIG. 1A is a block diagram of an exemplary ultrafast laser for use in accordance with the present technology.
FIG. 1B is a cross sectional representation of a processed layered material.

Embodiments according to the present technology may include an ultrafast laser performing ablation on a target component, such as a layered material. FIG. 1A is a block diagram of an exemplary ultrafast laser for use in accordance with the present technology. FIG. 1A includes a laser device 110, a target component 130, and a platform 140. Laser device 110 may direct ultrafast laser light 120 at target component 130 (e.g., layered material) which rests on platform 140. In some embodiments, parameters of the laser may be adjusted as the laser light is directed at target component 130. It will be understood that laser parameters may include, but are not limited to, pattern, pulse width, pulse energy level, focal point, frequency, laser repetition rate, fill spacing, number of passes, and combinations thereof.

According to some embodiments, the target component 130 may include a layered material (FIG. 1B) that comprises, for example, a base layer 145, one or more device layers (shown herein with a first device layer 150A and a second device layer 150B), and one or more getter layers 155 disposed on the uppermost device layer. The base layer 145 may include any organic and/or inorganic material. Common non-limiting examples of base layers include silicon wafers, metals, alloys, hard biological tissues, and so forth. Device layers may include, but are not limited to, glass, ceramics, semiconducting materials, plastics (e.g., polymers, bioplastics, resins, and so forth). Getter layers may be comprised of polymers, metals, and so forth. The term "getter" may also include sacrificial and resist. One of ordinary skill in the art will appreciate that the above description of the target component 130 is intended to be non-limiting and non exhaustive. That is, the exact numbers, types, and positioning of the various layers may vary greatly depending upon the product.

Generally speaking, the laser device 110 may include any laser emitting device that is configured to deliver energy in ultrashort pulses to ablate material. It is noteworthy to mention that the strength of the electric field generated by the beam of the ultrafast laser may increase significantly (above the ablation point of the material) such that the target molecules of the material begin to be ionized and create plasma, in a process known as optical breakdown. Ultimately, these molecules are removed from the material surface, or "ablated," without collateral damage to the remaining material. In contrast to the femtosecond and picosecond ultrafast lasers provided herein, long pulse devices utilize energy waves for ablating material that cause a mix of optical breakdown and traditional thermal processes. Unfortunately, these long pulse systems may cause significant heat transfers to the material and may thermally damage collateral areas surrounding the focal point of the beam.

It will be understood that ultrafast lasers produce pulses of light that may be less than a picosecond long in duration. The shortness of the pulses ensures that the ablation process is substantially caused by optical breakdown, while minimizing or eliminating thermal breakdown or degradation. Therefore, precise features may be machined into a variety of materials without introducing heat or thermal irregularities to the materials.

In some applications, the laser device 110 may utilize shock wave inducing ultrafast laser output to cause effects such as cleaving, ablating, dividing, separating, milling, cracking, weakening, splitting and so forth, within any layer of a layered material. The ultrafast laser output may create features such as device structures within a layer. Common examples of device structures may include, but are not limited to, apertures, grooves, channels, or voids having any desired three-dimensional geometrical configuration, size, or volume.

The laser device 110 may include both a laser emitting assembly 160 and a beam delivery assembly 165. The laser emitting assembly 160 may include any type of ultrafast laser generating device that can generate laser light output having pulse widths selected from any of femtosecond, sub-picosecond, and low range picosecond ranges.

As discussed in greater detail herein, the ultrafast laser light output generated by the laser emitting assembly 160 may be selectively varied by selectively varying any of pulse width, pulse energy level, frequency, laser repetition rate, or combinations thereof. Additionally, the selectively varying of the operational parameters of the beam delivery assembly 165 may affect parameters such as beam width, fill spacing, scan speed, focal point, and so forth. The beam delivery assembly 165 may be generally described as comprising optical and/or structural components that are utilized to focus and/or direct the ultrafast laser output generated by the laser emitting assembly 160. The construction and operation of beam delivery assemblies would be well known to one of ordinary skill in the art with the present disclosure before them. Therefore, a detailed discussion of the beam delivery assembly 165 will be omitted for the purpose of brevity.

As mention herein, these ultrafast laser light outputs generated by the laser device 110 may induce shock waves in layers of a layered material with minimal-to-no heating. The present technology may use these shock waves in a controlled fashion to introduce defects or cracks that can be propagated along a desired direction through subsequent processing (e.g., laser guided, thermal gradients, and/or mechanical stress). The present technology harnesses the high incident energy and athermal nature of ultrafast laser output to provide mechanisms for creating features such as device structures within the bulk of crystalline, poly/multi-crystalline and sintered substrates (e.g., layered materials).

These layered materials may be comprised of individual layers of different materials such as silicone (Si), Gallium Arsenide (GaAs), Sapphire, Silicon Carbide (SiC), glass formulations, ceramics, and so forth. By way of non-limiting example, the present technology may process a silicon, glass, or sapphire substrate, by creating a shallow trench (also known as a pilot trench) that may be further processed to create device structures and/or define a zone of cleaving (e.g., an outline or section of the substrate that is to be removed via ultrafast laser output) prior to final ablation or separation of the substrate to create the device structure.

In embodiments according to the present technology, the pilot trench may be created either using the same laser or by another process/system that may include chemical, laser, or mechanical processes. The high energy ultra-short pulses can then be applied along a path to create a pattern of device structures within the layer. In some embodiments, trenching may generate defects or cracks in the defined zone that can be propagated through via subsequent processing. Subsequent processing may include, but is not limited to, dry etching, wet etching, plasma etching and combinations thereof.

It is noteworthy that material may or may not be removed from the substrate during the creation of these defects or cracks. The defects may be designed to induce cracks that are substantially perpendicular or orthogonal to the direction of the trench (e.g., a tool path that is defined by the movement of the laser device 110 relative to the target component 130). In other embodiments, such as with the cutting of sapphire wafers (e.g., electrical devices), the present technology may be utilized to process the substrate without a predefined trench.

Additionally, the present technology may utilize several crack propagation techniques for creating device structures within individual layers of layered material. With regard to lasers, laser output typically uses complex architectures to create and propagate cracks. In glass cutting, a water jet nozzle may produce a concentrated jet of water that trails a carbon dioxide ($CO_2$) laser beam to actively cool the heated substrate and maintain its temperature within the glass transition regime and induce local softening and crack propagation. In some cases, the cracks are initiated mechanically. For example, when cutting silicon wafers, nanosecond or picosecond lasers may generate localized heated zones that create defects that may be propagated during subsequent processing. These zones can be subsurface or on the surface of the substrate (or other layer).

It will be understood that traditional approaches may utilize lasers to ablate through the stacked materials and the substrate utilizing a single beam of laser output. The laser output may have a single wavelength and a constant operating profile (e.g., pulse duration, pulse width, fill spacing, and so forth). These traditional approaches often create processed products with defects such as cracking (both internal and external surface irregularities).

Advantageously, the present technology may leverage the inherent athermal interaction of the ultrafast laser output of the laser device 110 with layers of layered material by combining these athermal interactions with other subsequent processes or manufacturing techniques to create high throughput manufacturing processes that enable the proliferation the present technology (such as laser device 110) into high volume manufacturing environments.

The present technology limits the thermal exposure and extent of machining of layered materials to enhance processing yields and reduce overall manufacturing costs. Again, the present technology may be used for cutting, cleaving, slotting, or otherwise processing materials such as crystalline, poly/multi-crystalline, sintered materials, and so forth.

The present technology may be used for creating device structures in layered materials, even those requiring device structures having tight tolerances. Suitable products created by the present technology may be utilized to create semiconductors, light emitting diode (LED) and other display substrates, disk drive heads, and so forth. In some exemplary use cases, the present technology may be used to process materials that absorb wavelengths of approximately 1552 nanometers or various harmonics thereof, to create features within the materials at the correct precision (physical tolerances), fidelity and productivity, or combinations thereof. It will be understood that the present technology may not be limited to only the use of ultrafast laser output of approximately 1552 nanometers, but may be tailored to the physical attributes of the layers of the layered material.

Figure 2:
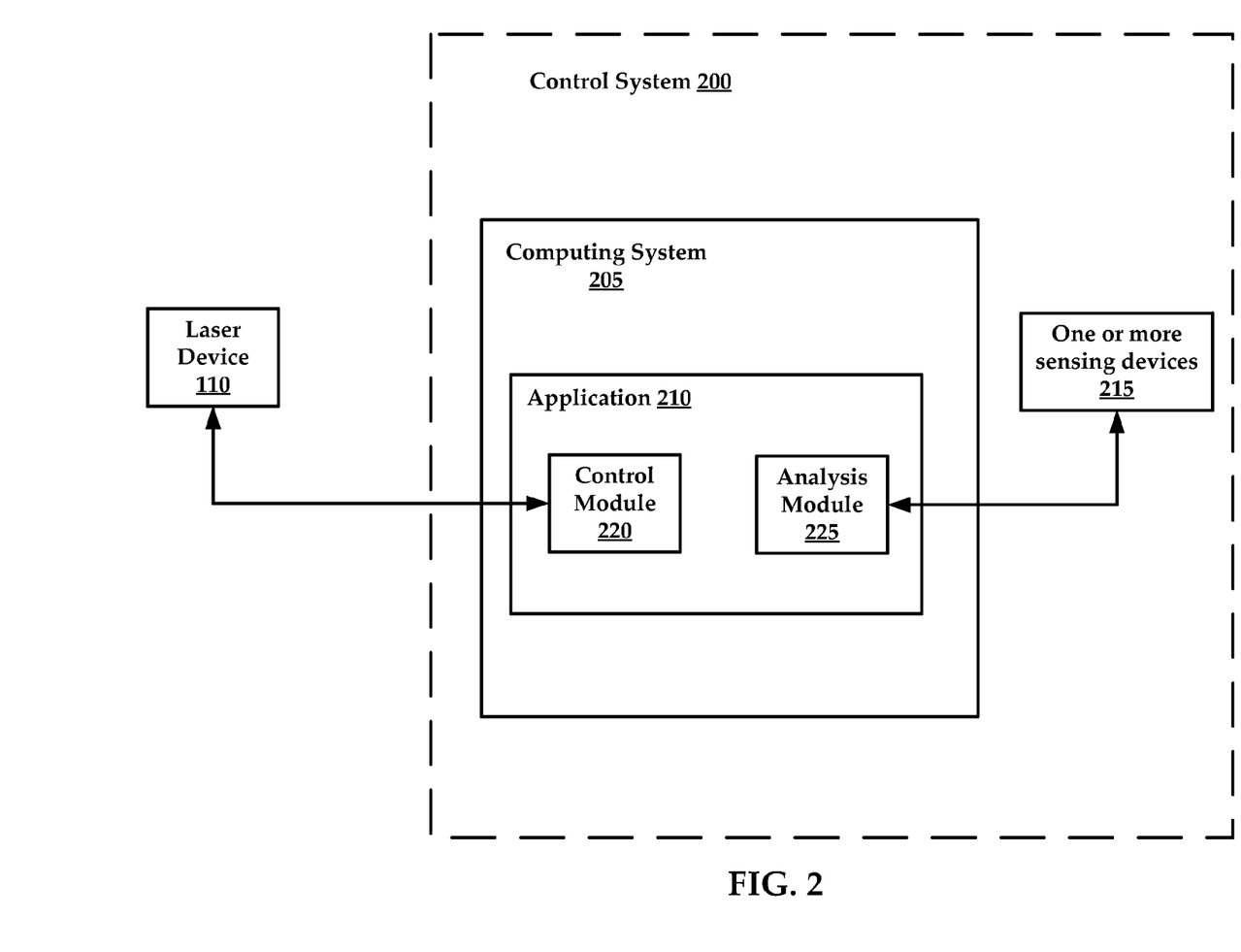
FIG. 2 is a block diagram of an exemplary control system for an exemplary ultrafast laser device.

FIG. 2 illustrates a block diagram of an exemplary control system 200 for operating an exemplary ultrafast laser device, such as laser device 110 described with reference to FIG. 1A. Generally speaking, the control system 200 may include a computing system 205 that includes a laser controller application (hereinafter application 210) that, when executed by a processor, controls the operation of the laser device 110. General operations of the computing system 205 may be described in greater detail with reference to the computing system 400 of FIG. 4. The application 200 may cause the computing system 205 to function as a particular purpose computing system that allows the laser device 110 to process the layers of a layered material (such as target component 130).

The computing system 205 may include a standalone computing system that communicatively couples with the laser device 110, or may be integrated into the computational components of the laser device 110.

In some embodiments, the computing system 205 may be communicatively coupled with one or more sensing devices 215 that measure the physical attributes of the layers of the layered material. Because of the virtually unlimited variety of sensors or measurement devices which may be utilized in accordance with the present technology, a discussion of these devices has been omitted for the purposes of brevity. One of ordinary skill in the art would readily appreciate the use of such suitable sensors that may measure any one of a number of physical attributes of the layers of the layered material. In general, these physical attributes may include physical attributes that affect the manner with which ultrafast laser output interacts with the layers of the layered material, for example, density and opacity. In some embodiments, rather than sensing the physical attributes of the layers, the physical attributes may be known quantities that may be input into the application 200.

The application 200 may be generally described as including a control module 220 and an analysis module 225. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The control module 220 may selectively adjust the operation of both the laser emitting assembly 160 and the beam delivery assembly 165 to vary the operating parameters of the laser device 110 (see FIG. 1A). Advantageously, the selective adjustment of these operating parameters allows for the ultrafast laser output of the laser device 110 to be fine tuned for each layer of the target component 130.

The fine tuning may be based upon the determination of the physical attributes of a particular layer as determined by the analysis module 225. In order for the control module 220 to fine tune (e.g., selectively vary) the ultrafast laser output, the analysis module 225 may receive layer information from the one or more sensing devices 215 that determine or approximate the physical attributes of a layer (or a plurality of layers in a multilayered device). Again, these physical attributes may not need to be measured, but may be known quantities that are input into the application 200 via a user interface (not shown).

Returning to FIG. 1B, a layered material (target component 130) may include a getter layer 155 disposed on top of a first and second device layers, 150A and 150B, respectively. The material may also include a base layer (substrate) 145. In this example, the first device layer 150A is comprised of a first material, and the second device layer 150B is comprised of a second material. For the purposes of explicating the fine tuning of the laser device 110, the getter layer 155 is understood to have different physical attributes relative to the first and second device layers 150A and 150B. To process this layered material, it will be assumed that the physical attributes of each layer have been input into the system, or determined via the one or more sensing devices.

The control module 220 selectively varies the operating parameters of the laser device 110 (by selectively varying the configuration of at least one of the laser emitting assembly 160 and the beam delivery assembly 165) to ablate the getter layer 155. Next, the control module 220 causes the laser device 110 to apply ultrafast laser output to the getter layer to ablate the getter layer along a particular pattern (e.g., tool path). In some embodiments, the entire getter layer 155 may be ablated or removed. The ablated portion of the getter layer 155 is shown as void 170.

Ablation of the getter layer exposes a portion of first device layer 150A that is under void 170. Again, based upon the physical attributes of the first device layer 150A, the control module 220 selectively varies the operating parameters of the laser device 110 to ablate at least a portion of the first device layer to create features therein, such as void 175. These features may include through vias, device structures (e.g., grooves, channels, voids, spaces, and so forth), and the like. It will be understood that these features may have any one of a number of regular or irregular three dimensional geometrical or polygonal configurations.

Next, the based upon the physical attributes of the second device layer 150B, the control module 220 selectively varies the operating parameters of the laser device 110 to ablate at least a portion of the second device layer 150B to create features therein, such as void 180. It will be understood that the features formed in the second layer 150B may be created by focusing the ultrafast laser output of the laser device 110 to a particular depth within the second device layer 150B. That is, it may not be necessary to expose the second layer 150B by ablating the first layer 150A, before features may be created in the second device layer 150B. In this way, device structures of different layers may overlap one another. Additionally, the laser device 110 may create apertures (such as aperture 185) that extend between device structures of different device layers. These apertures may receive conductive material that electrically couples electrical devices disposed in different device layers.

Figure 3:
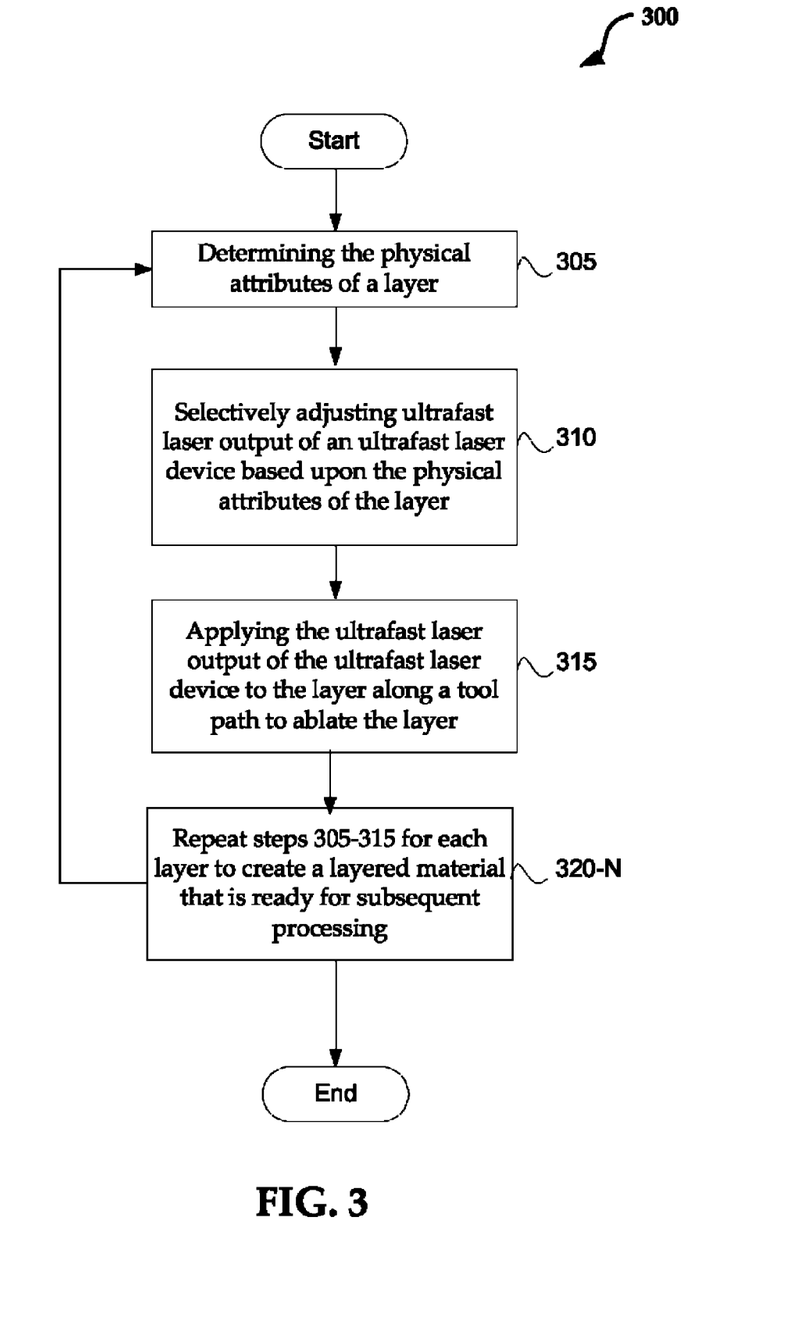
FIG. 3 is a flowchart of an exemplary method for selectively ablating one or more layers of a layered material.

FIG. 3 is a flowchart of an exemplary method 300 for selectively ablating one or more layers of a layered material. It will be understood that in some embodiments, the layered material may include a layered device such as a semiconductor wafer. As such, the method may be utilized to create features within the wafer such as device structures that are created to receive electrical devices therein. Electrical devices may include objects such as sensors, processors, storage media, segments of electrically conducting materials for interconnecting electrical devices, and the like.

Also, the method 300 may be utilized to prepare the wafer for subsequent processing steps such as dry/wet etching, deposition, implantation, ion bombardment, texturing, and/or polishing—just to name a few.

The method may begin with an optional step 305 of determining the physical attributes of a layer that is to be ablated. This step 305 may be executed by receiving the output of one or more sensing devices that measure the physical attributes of the layer.

Upon receiving the physical attributes of the layer, the method moves to step 310 that includes selectively adjusting ultrafast laser output of an ultrafast laser device based upon the physical attributes of the layer. This step 310 may be executed by a control module that selectively varies the operating parameters of the laser device, as described in greater detail above.

Next, the method 300 may include the step 315 of applying the ultrafast laser output of the ultrafast laser device to the layer along a tool path to ablate the layer along the tool path.

After ablation of the layer, the method 300 may include return to step 305 of determining the physical attributes of an additional layer before executing steps 310 and 315 to ablate the additional layer and create features therein. The method 300 may return to step 305 for each layer that is to be ablated.

As mention above, if the physical properties of each of the layers are known, step 305 may be omitted. Therefore, the method 300 may comprise recurrently or successively executing steps 310 and 315 to process the wafer.

It will be understood that method 300 may be utilized to prepare the layered material for subsequent processing, which may include singulation or dicing of the wafer from a larger wafer. These subsequent processes may utilize processes such as wet/dry etching, plasma etching, laser modification in combination with laser fracturing, mechanical cleaving, and so forth.

Figure 4:
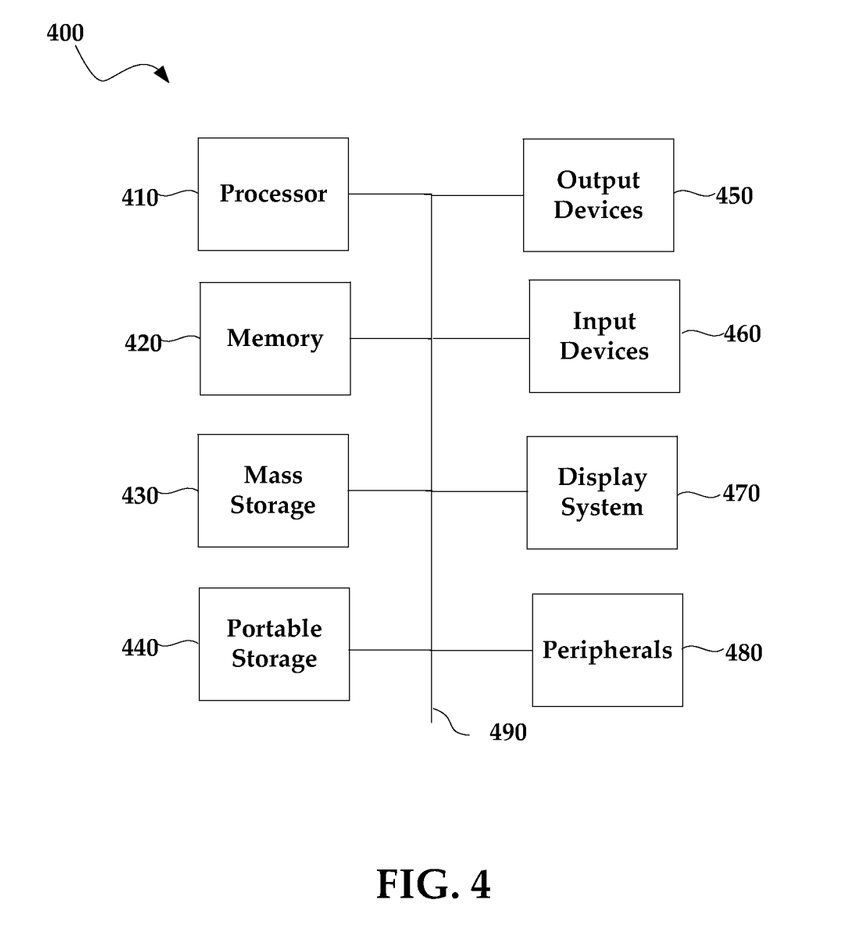
FIG. 4 illustrates an exemplary computing system that may be used to implement embodiments according to the present technology.

FIG. 4 illustrates an exemplary computing system 400 that may be used to implement an embodiment of the present technology. The computing system 400 of FIG. 4 may be implemented in the contexts of the likes of computing systems, networks, servers, or combinations thereof. The computing system 400 of FIG. 4 includes one or more processors 410 and main memory 420. Main memory 420 stores, in part, instructions and data for execution by processor 410. Main memory 420 may store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 may store the system software for implementing embodiments of the present technology for purposes of loading that software into main memory 420.

Portable storage device 440 operates in conjunction with a portable non-volatile storage medium, such as a floppy disk, compact disk, digital video disc, or USB storage device, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components provided in the computing system 400 of FIG. 4 are those typically found in computing systems that may be suitable for use with embodiments of the present technology and are intended to represent a broad category of such computer components that are well known in the art. Thus, the computing system 400 of FIG. 4 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for selectively ablating one or more layers of a layered material, the method comprising:
   (a) using a sensing device to determine one or more physical attributes of a layer of the layered material and selectively adjusting ultrafast laser output of an ultrafast laser device before an application of the ultrafast laser output based upon the one or more physical attributes of the layer of the layered material;
   (b) applying the ultrafast laser output of the ultrafast laser device to the layer of the layered material along a tool path to ablate the layer along the tool path;
   (c) re-executing steps (a) and (b) to ablate one or more additional layers, the re-execution of steps (a) and (b) occurring for each distinct layer of the layered material that is to be ablated; wherein
   the selective ablation of the layered material prepares the layered material for subsequent processing, wherein applying the ultrafast laser output to the one or more additional layers occurs substantially simultaneously relative to the applying ultrafast laser output to a getter layer, wherein the additional layer being disposed below an ablated portion of the getter layer.

2. The method according to claim 1, wherein selectively adjusting ultrafast laser output includes any selectively adjusting one or more of tool path pattern, pulse width, pulse energy level, focal point, frequency, laser repetition rate, laser beams fill spacing, number of passes, and combinations thereof, for the ultrafast laser device.

3. The method according to claim 2, wherein the pulse width is selected from any of a femtosecond, a picosecond, nanosecond, and combinations thereof.

4. The method according to claim 1, wherein the layered material includes a base layer, one or more device layers layered upon the base layer, and a getter layer covering an uppermost device layer of the one or more device layers.

5. The method according to claim 4, wherein the base layer includes any of an organic and an inorganic material.

6. The method according to claim 4, wherein subsequent processing includes any of dry etching, wet etching, plasma etching, cleaving, optical lithography, cleaning, texturing, and combinations thereof.

7. The method according to claim 4, wherein the getter layer is comprised of any of a metallic alloy and a polymer.

8. A method of operating an ultrafast laser device to process layers of a layered material, the method comprising:
   (a) using a laser controller application to control a selectively adjustable ultrafast laser output wherein the laser controller application is executed by a control module and an analysis module; wherein using the laser controller application comprises:
      (i) selectively varying operating parameters of the ultrafast laser device to ablate a getter layer using the control module;
      (ii) selectively varying the operating parameters of the ultrafast laser device to ablate at least a portion of a first device layer to create features therein; and
      (iii) selectively varying the operating parameters of the ultrafast laser device to ablate at least a portion of a second device layer to create features therein;
   (b) before an application of ultrafast laser pulse determining one or more physical attributes of a particular layer using the analysis module by receiving layer information from one or more sensing devices that determine the physical attributes of the layers; and
   (c) determining the physical attributes of additional layers and selectively ablating the additional layer; wherein
      the selective ablation of the layered material prepares the layered material for subsequent processing, wherein applying the ultrafast laser output to the first device layer, the second device layer, or any additional layers occurs substantially simultaneously relative to applying the ultrafast laser output to a getter layer, wherein the first device layer, the second device layer, and any additional layers disposed below an ablated portion of the getter layer.

9. The method according to claim 8, wherein the subsequent processing comprises dry etching, wet etching, plasma etching, doping, implantation, deposition, cleaving, laser modifications with laser fracturing, mechanical cleaving, texturing, or a combinations thereof.

10. The method according to claim 8, wherein the using the laser controller application to control a selectively adjustable ultrafast laser output comprises cutting, cleaving, slotting, or otherwise processing materials wherein the processing materials are crystalline, polycrystalline and multicrystalline sintered materials.

11. The method according to claim 8, wherein the using the laser controller application to control a selectively adjustable ultrafast laser output includes selectively adjusting one or more of a pattern, a pulse width, a pulse energy level, a focal point, a frequency, a laser repetition rate, a fill spacing, a number of passes, and a combination thereof.

12. The method according to claim 11, wherein the pulse width is selected from any of a femtosecond, a picosecond, nanosecond, and combinations thereof.

13. The method according to claim 8, wherein the layered material comprises a base layer, the first device layer and the getter layer covering an uppermost device layer of the one or more device layers.

14. The method according to claim 13, wherein the getter layer comprises a metallic alloy or a polymer.

15. The method according to claim 13, wherein the base layer comprises an organic or an inorganic material.

* * * * *